United States Patent Office 2,943,346
Patented July 5, 1960

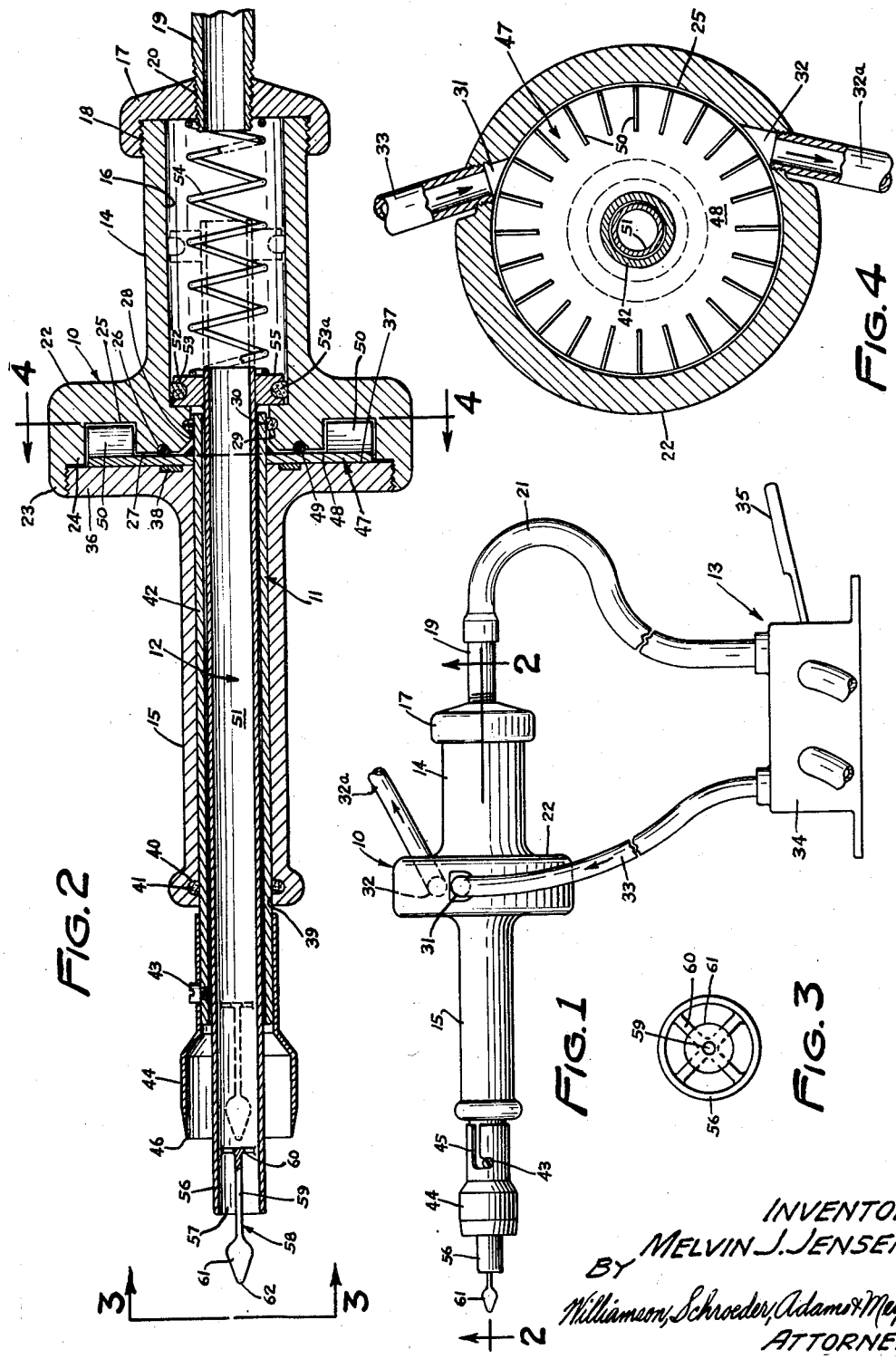

2,943,346

EVISCERATING TOOL

Melvin J. Jensen, 34 N. 7th St., Barron, Wis.

Filed Oct. 10, 1957, Ser. No. 689,334

3 Claims. (Cl. 17—11)

This invention relates to eviscerating fowl for the food market, and more particularly to a tool to be utilized therefor.

In recent years, it has become a practice to avoid the use of dowels, strings and the like for retaining an eviscerated bird in compact form, but rather to use natural slits and openings which have necessarily been formed as a result of the eviscerating operation as a means for retaining the cut ends of the legs and the tail portion tucked therein. The operator in dressing a fowl cuts around the vent of a bird and then withdraws the entrails and other unwanted materials. The tail is folded over and tucked within the opening and the cut hocks of the fowl are then pulled closely to the sides of the bodies and are also tucked into the opening to retain the extremities against protrusion. At times, an unnecessarily large opening may be accidentally cut out and the hocks and tails are then not properly retained in their in-tucked position. Further, there is invariably a small amount of wasted meat cut from the area of the vent which may amount to about one-quarter to one-half an ounce per bird. In a poultry dressing operation of moderate size, there may be around 250 pounds of meat per day wasted through such inefficient cutting operation.

It is an object of the present invention to provide an eviscerating tool for the dressing of fowl which will efficiently and economically make a properly sized opening for removing the entrails therefrom and for in-tucking the tail and hock portions and without resorting to external fastening means.

It is a further object of the invention to provide a tool of the class described which will be safe and rapid in operation and capable of utilizing power means readily available in a conventional poultry dressing establishment.

It is a still further object of the invention to provide an eviscerating tool which will not require skilled workmanship to properly center and perform the prescribed operation, but rather will be semi-automatic and hence will foster a continuous and rapid eviscerating procedure over long sustained periods of time while maintaining the efficiency of an operator at a high level.

These and other objects and advantages of the invention will more fully appear from the following description, made in connection with the accompanying drawings, wherein like reference characters refer to the same parts throughout the several views and in which:

Figure 1 is a side elevation of my eviscerating tool, portions of the fluid supply lines being cut away and other parts being shown diagrammatically;

Figure 2 is an enlarged vertical section taken on the line 2—2 of Figure 1, the dotted line configuration indicating the retracted position of the centering and guarding element;

Figure 3 is an enlarged front view taken from the forward end of the device as indicated by the arrows 3—3 in Figure 1; and Figure 4 is another vertical section taken on the line 4—4 of Figure 2.

With continued reference to the drawing, my eviscerating tool comprises generally a housing 10, a rotor 11, a centering and guarding element 12, and control means 13.

The housing 10 is suitably divided into several parts, the rear portion being designated as 14 and the forward portion designated as 15. The rear portion 14 of housing 10 is provided with a piston chamber 16 and is closed at the rear end by cap member 17 threadably secured at 18 to the rear housing portion 14, as shown. Cap 17 may be provided with a stem 19 threadably secured to cap 17 at 20 and communicating with the chamber 16. A vacuum duct 21 communicates therewith for the purpose of supplying partial vacuum to the interior of chamber 16. The rear housing portion 14 has an enlarged or flared end 22 with a forward threaded annulus 23, as shown. A shouldered off-set 24 is formed radially inward of the outer annulus 23 and an annular groove 25 is formed still further radially inward from the annular portions 23 and 24. An annular groove 26 is formed in the forwardly facing circular area 27 for purposes of providing a sealed connection with the rotor 11 as will be subsequently described. A reduced cylindrical portion 28 is also formed on the rear housing portion 14 and this cylindrical portion may be provided with an annular groove 29 for retaining an O-ring 30 in conventional manner. The main chamber 16 has a larger dimension than the reduced cylindrical area 28, as will be noted from reference to Figure 2.

The rear housing portion 14 is also provided with threaded tangential openings 31 and 32 as shown in Figure 4. The opening 31 is intended for a hydraulic inlet and communicates with the hydraulic line 33 as shown in Figure 1. Threaded opening 32 provides a hydraulic outlet and communicates with the fluid outlet line 32a as shown in Figure 1. Both of the threaded inlets 31 and 32 communicate with the annular groove or space 25 as a source of power for the rotor 11. The vacuum duct 21 and fluid line 33 are intended to be valved and may be simultaneously closed and opened by such means as the valve block 34 in control means 13. The valve 34 may be conveniently placed on the floor and provided with a foot-operated pedal 35 to effect the simultaneous opening and closing of the vacuum duct 21 and fluid line 33.

The forward housing portion 15 has a rear flared portion 36 externally threaded to mate with the threaded portion 23 of the rear housing portion 14, as shown in Figure 2. The threaded flared portion 36 is also provided with a rear circular face 37 in which a lead seal 38 may be annularly positioned, as shown. The forwardly extending housing portion 15 has an opening 39 which also provides a bearing and may be provided with a groove 40 adapted to receive an O-ring 41 in conventional manner. The opening 39 is formed all the way through the forward housing portion 15 and is aligned with the chamber 16. Since the tool is designed to be utilized for food preparation, the entire housing is preferably constructed of an easily cleaned and sterilized material such as Monel metal.

Lying rotatably within the opening 39 is the rotor 11. The rotor 11, in turn, has a hollow portion such as shaft 42 which is rotatably mounted and sealed within the opening 39 by means of O-ring 41 and also by means of O-ring 30 disposed in the rear housing portion 14 as previously described. The hollow shaft 42 projects outwardly beyond the end of the forward housing portion 15 through opening 39 and is provided with a fastening means such as the screw 43 threadably received transversely through the wall of hollow shaft 42. A cylindrical cutting head 44 is adapted to be mounted externally of the projecting end and forwardly of shaft 42. The cutting head 44 may be provided with a bayonet-type groove 45 which will hold the cutting head 44 in coaxial relation with the hollow shaft 42. The forward portion of cutting head 44 terminates in a cylindrical cutting edge 46 as shown in Figures 1 and 2. Where cutting head 44 is made a seperate element, the diameter of the cutting edge 46 may be varied from head to head so that the circular cut opening can be predetermined for various sized burrs.

At the inner end of the rotor 11 and secured with the hollow shaft 42 is a hydraulic drive wheel 47. The drive wheel, in turn, comprises a disc 48 which bears against the lead seal 38 and is sealed by O-ring 49 which may be received within the groove 26. Marginally of the outer circumference of the disc 48 is provided a plurality of vanes 50 closely conforming to the cross section of the annular space 25 provided in the rear housing portion 14. As will be obvious from Figure 4, the application of pressurized liquid through the line 33 will cause the entire rotor 11 to rapidly rotate, the exhaust fluid being discharged through the threaded opening 32 and through the exhaust line 32a threadably connected thereto. When thus rotating, the only movement of the rotor is one of simple rotation and no endwise thrust with respect to the forward housing portion 15 is permitted.

The centering and guarding element 12 lies lengthwise within the hollow shaft 42 and may itself comprise a hollow shaft or tubular member 51 having an annular piston 52 secured to the rear end thereof which, in turn, is slidably received within the chamber 16. The piston 52 may be annularly grooved as at 53 to receive an O-ring seal 53a in the conventional manner. It will be observed that the hollow or tubular character of the elongated portion 51 is retained through the piston 52 so that communication is retained with the piston chamber 16 and with the vacuum duct 21 previously described. A compression spring 54 is interposed between the cap 17 and the rear face 55 of the piston 52, and maintains the centering and guarding element 12 normally in forward or extended position as shown in the full line configuration of Figure 2. The forwardmost part of the tube 51 terminates in a nozzle 56 having an orifice 57, as shown. A probe 58 having a slender portion 59 at the rear thereof is secured to spokes 60 which, in turn, are radially fastened to the interior wall of the tube 51 in spaced relation with the orifice 57. Air is permitted to flow through the orifice and into the interior of the tube 51 by passing through the spoke members 60. At the forward end of the probe 58 is an enlarged bulb 61 having a somewhat pointed end 62 as shown.

In the use and operation of my eviscerating tool, vacuum is applied, and water pressure is also provided for the device through the operation of the valve 13. In the form shown, the foot pedal 35 is depressed for simultaneous actuation of the fluid lines. Since the tubular forward portion of the centering and guarding element is open-ended, air will be sucked into the tube 51 past the spokes 60 and will continue through the piston 52 and out through the vacuum duct 19. There will be insufficient lowering of the air pressure within the chamber 16 to cause the piston 52 to move rearwardly. At the asme time, water under pressure in line 33 will enter the threaded intake of the rear housing portion 14 and cause the disc 48 to rotate rapidly because of the impinging of water on blades 50. The spent water will be ejected through the threaded discharge passageway 32 and into discharge line 32a. The rotation of the disc 48 causes the entire rotor 11 to rotate and the cutting head 44 will likewise rotate. Since the forward end 56 of the tube 51 projects beyond the cutting edge 46 of cutting head 44, the edge will be guarded against accidental cutting of the fowl.

The tool is then brought to the fowl and probe 58 is inserted into the vent thereof. The enlarged end portion 61 is designed to prevent fecal matter from being withdrawn during the cutting operation. When the opening 57 is colsed by contact of the forward end 56 with the skin surrounding the vent, the air intake will be interrupted and vacuum will build up within the chamber 16. Piston 52 together with the entire centering and guarding element 12 will then be retracted against the compression of spring 54. The retraction causes relative movement of the fowl and the cutting edge 46 convergently until the rotating cutter severs a circular piece of skin surrounding the vent. The foot pedal 35 is then raised to stop the application of vacuum and rotating power for the cutting head and the device is withdrawn from the fowl.

Because the cutting head is properly centered, a much smaller cut can be made than when an opeartor makes the cut by hand. Furthermore, the size of the cut opening can be selected to exactly accommodate the tail portion of the bird and the cut hocks to fold the carcass of the fowl in a compact manner as heretofore described.

It may thus be seen that I have devised an eviscerating tool which greatly increases the efficiency of fowl dressing, both as to the number of birds which can be eviscerated per day by a single operator, and as to the weight of meat which may be saved by use of my eviscerating tool.

It will, of course, be understood that various changes may be made in the form, details, arrangements and proportions of the parts without departing from the scope of my invention.

What I claim is:

1. An eviscerating tool for fowl comprising, a housing having a chamber terminating forwardly in an opening and rearwardly in a vacuum duct, a rotor mounted for rotation within said housing and having a hollow elongated portion extending forwardly through the chamber opening and terminating in a cylindrical cutting edge, a tubular centering and guarding member mounted within the hollow elongated portion and axially slidable with respect thereto, said tubular centering and guarding member being normally biased forwardly of the cylindrical cutting edge and terminating in an air inlet nozzle, and vacuum means connecting with said vacuum duct and adapted to retract the tubular centering and guarding member upon contact of the air inlet nozzle with the skin surrounding the vent of a fowl whereby to bring the cylindrical cutting edge of the rotor into contact therewith and to cut in a predescribed circle therearound.

2. An eviscerating tool for fowl comprising, a housing having an elongated piston chamber, said piston chamber terminating forwardly in a coaxial bearing opening, a rotor mounted within the housing in spaced relation with the piston chamber and having a hollow shaft aligned with the piston chamber and rotatably received in the bearing opening and extending forwardly thereof, a cutting head terminating forwardly in a cylindrical cutting edge secured to the forward end of said hollow shaft, a tubular centering and guarding member mounted within the hollow shaft and having a piston at the rear portion received by the piston chamber and adapted to slide forwardly and rearwardly with respect thereto, said tubular centering and guarding member having a nozzle at its forward terminus and being normally biased forwardly of the cylindrical cutting edge, a spring within the piston chamber normally biasing the piston and tubular centering and guarding member to its forwardmost position, and vacuum means communicating with the piston chamber and adapted to pull back the piston and centering and guarding member when the nozzle is shut off against the skin of a fowl, whereby the skin will be maintained in contact with the nozzle and pulled against the cutting edge to sever a predetermined circular area of the skin.

3. An eviscerating tool comprising, a housing adapted to be grasped by hand, cylindrical cutting means rotatably mounted on the housing, a retractable centering and guarding element lying lengthwise within the cylindrical cutting means, said centering and guarding element having an opening therethrough extending outwardly beyond the cutting means, a probe mounted in said opening terminating forwardly of said centering and guarding element for plugging a vent, and means responsive to the closure of said opening by contact with the skin of a fowl for retracting said centering and guarding element, whereby said cylindrical cutting means engages said skin for circular severance thereof while said probe prevents excretion from contaminating said circular severance.

References Cited in the file of this patent
UNITED STATES PATENTS

| | | |
|---|---|---|
| 1,775,918 | Smith | Sept. 16, 1930 |
| 2,506,802 | Magnuson et al. | May 9, 1950 |
| 2,590,785 | Nealy | Mar. 25, 1952 |
| 2,655,190 | Mason et al. | Oct. 13, 1953 |
| 2,785,434 | Terranova | Mar. 19, 1957 |
| 2,795,815 | Dahlberg | June 18, 1957 |